United States Patent
Park et al.

(10) Patent No.: US 7,913,036 B2
(45) Date of Patent: Mar. 22, 2011

(54) METHOD AND APPARATUS FOR MANAGING THE BLOCK ALLOCATION TABLE OF A MULTIMEDIA DATA FILE SYSTEM

(75) Inventors: Sung-jae Park, Suwon-si (KR); Il-woo Park, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 482 days.

(21) Appl. No.: 11/964,835

(22) Filed: Dec. 27, 2007

(65) Prior Publication Data

US 2009/0073595 A1 Mar. 19, 2009

(30) Foreign Application Priority Data

Sep. 19, 2007 (KR) .................. 10-2007-0095450

(51) Int. Cl.
*G06F 12/02* (2006.01)
(52) U.S. Cl. ........................ 711/112; 711/114
(58) Field of Classification Search ................ None
See application file for complete search history.

(56) References Cited

U.S. PATENT DOCUMENTS

| | | | |
|---|---|---|---|
| 2002/0059305 A1* | 5/2002 | Haneda | 707/200 |
| 2003/0163594 A1* | 8/2003 | Aasheim et al. | 709/310 |
| 2004/0230573 A1* | 11/2004 | Rhoads et al. | 707/3 |
| 2008/0059751 A1* | 3/2008 | Nakamura | 711/170 |

FOREIGN PATENT DOCUMENTS

| | | |
|---|---|---|
| EP | 1028384 | 8/2000 |
| EP | 1408411 | 4/2004 |
| EP | 1560218 | 8/2005 |
| EP | 1744316 | 1/2007 |
| JP | 2003-52006 | 2/2003 |

OTHER PUBLICATIONS

Search Report issued in corresponding European Patent Application No. 08151323 dated Dec. 12, 2008.

* cited by examiner

*Primary Examiner* — Than Nguyen
(74) *Attorney, Agent, or Firm* — NSIP Law

(57) ABSTRACT

A method and apparatus for editing multimedia data stored in a disk. The method generates a Block Allocation Table (BAT) in the disk, wherein the BAT records a connection relationship between each of blocks based on a connection relationship between each of data stored in the respective blocks generated by dividing storage space of the disk having a predetermined size; and revises the connection relationship, which is between each of the blocks and is recorded in the BAT, when the connection relationship between each of the blocks is changed.

21 Claims, 9 Drawing Sheets

METHOD AND APPARATUS FOR MANAGING THE BLOCK ALLOCATION TABLE OF A MULTIMEDIA DATA FILE SYSTEM

CROSS-REFERENCE TO RELATED APPLICATIONS

This application claims the benefit of Korean Patent Application No. 2007-95450, filed in the Korean Intellectual Property Office on Sep. 19, 2007, the disclosure of which is incorporated herein by reference.

BACKGROUND OF THE INVENTION

1. Field of the Invention

Aspects of the present invention relate to a method of editing multimedia data, and more particularly, to a method of promptly and efficiently editing multimedia data in units of single blocks without temporarily moving and copying the multimedia data, thereby managing the multimedia data.

2. Description of the Related Art

In order to perform an edit operation in a conventional file system, a procedure for copying data is required, and thus, spare memory space or spare disc storage space is necessary. In order to edit a mass data file, the conventional file system generates a new file, and moves and stores data to be edited in the generated new file according to a desired array. Hence, a temporary data file for editing the data and a temporary memory space for copying the data are required.

FIG. 1A shows a method of inserting data in a conventional method of editing multimedia data. B data 120 is to be inserted between A data 102 and C data 104 without changing an original position of the A data 102 and C data 104 in an original file 100.

According to the conventional method, a new file 110 is allocated as a result file. The A data 102 is read from the original file 100 and recorded in the result file 110. The B data 120 is read from a memory and recorded and stored after the A data 102 of the result file 110. The C data 104 is read from the original file 100 and recorded and stored after the B data 120 of the result file 110. Thus, when the new file 110 is allocated, the A data 102, the B data 120, and the C data 104 have to be moved so as to be respectively copied.

FIG. 1B shows a method of deleting data in the conventional method of editing multimedia data. As shown in FIG. 1B, B data 156 between A data 152 and C data 154 is to be deleted from an original file 150, and the A data 152 and the C data 154 are to be connected. In this case, a procedure for copying and storing the A data 152 and the C data 154 in a result file 160 is also required.

Referring to FIGS. 1A and 1B, a procedure for generating a new file and copying data is required in a data edit procedure. A memory space larger than a specific size for copying the new file and the data has to be guaranteed. In addition, since the amount of multimedia data increases, mass data has to be moved and stored in a procedure for editing mass multimedia data, thereby taking a long time to carry out the procedure.

SUMMARY OF THE INVENTION

Aspects of the present invention provide a method and apparatus for editing multimedia data, wherein the method and apparatus reduce a memory or temporary disk space, which is used as a temporary storage space in a data insertion or deletion procedure.

Additional aspects of the present invention provide a method of editing multimedia data, wherein the method does not require the generation of a new file for finally storing a result of editing, and minimizes a frequency of disk access for moving or storing data.

According to an aspect of the present invention, a method of editing multimedia data stored in a disk is provided. The method includes generating a BAT (Block Allocation Table) in the disk, wherein the BAT records a connection relationship between a plurality of blocks based on a connection relationship between data stored in the respective blocks generated by dividing storage space of the disk having a predetermined size; and revising the connection relationship when the connection relationship between each of the blocks is changed.

According to another aspect of the invention, the BAT includes a number of BARs (Block Allocation Records) equal to the number of blocks, and each BAR includes a data size, a previous block index, and a next block index that are stored in a corresponding block.

According to another aspect of the present invention, the method further includes managing movement or storage of data stored in the blocks.

According to another aspect of the present invention, when inserting data of a second block between first data that is previous data and second data that is next data which are divided based on a predetermined position of each data in a first block, the managing includes moving and storing the second data in a third block without moving the first data from the first block, and the revising of the connection relationship in the BAT includes revising the BAT based on a connection relationship among the first block, the second block, and the third block.

According to another aspect of the present invention, the managing includes storing the second data in a storage start position of the third block and determining an empty area of the first block and an empty area existing after an area storing the second data to be unused areas, the empty area of the first block previously stored the second data, and the empty area existing after the area is in the third block.

According to another aspect of the present invention, when inserting input data between first data that is previous data and second data that is next data, which are divided based on a predetermined position of each data in a first block, the managing includes moving and storing the second data in a temporary storage area; storing part of the input data after the first data of the first block corresponding to a size of an area in which the second data was stored; storing remaining data of the input data in a storage start position of a second block that is a new block; and storing the second data after an area in the second block that stores the remaining data of the input data, and the revising of the connection relationship in the BAT includes revising the BAT based on a connection relationship between the first block and the second block.

According to another aspect of the present invention, in the second block, an empty area existing after an area storing the second data is determined to be an unused area.

According to another aspect of the present invention, when merging a first block and a second block, where first data is stored in the first block and second data is stored in the second block, if an empty area existing after an area storing the first data of the first block is larger than a size of the second data, the managing includes storing the second data in the empty area existing after the first data of the first block, and the revising of the connection relationship in the BAT includes deleting a connection relationship between the first block and the second block from the BAT.

According to another aspect of the present invention, when deleting data, when a first block stores a start part of the data and a second block stores an end part of the data, the managing includes determining an area storing the start part of the data in the first block to be an unused area; determining an area storing the end part of the data in the second block to be an unused area; and storing data of a remaining area of the second block in a storage start position of the second block.

According to another aspect of the present invention, when the data further includes other data of one or more blocks between the start part of the data of the first block and the end part of the data of the second block, the managing further includes deleting the other data of the one or more blocks, and the revising of the connection relationship in the BAT includes deleting a connection relationship among the first block, the one or more blocks, and the second block; and revising the BAT based on a connection relationship between the first block and the second block.

According to another aspect of the present invention, the method further includes generating a frame index including frame information that is at least one of reproduction time information per frame of the multimedia data, storage position information, and information on a kind of a frame; extracting from the frame index the frame information on one or more frames to be edited; and determining blocks storing the one or more frames to be edited, using the extracted frame information; and the revising of the connection relationship in the BAT includes revising a relationship among each of the determined blocks in the BAT.

According to another aspect of the present invention, a multimedia data edit apparatus is provided to edit multimedia data stored in a disk having a predetermined size. The multimedia data edit apparatus includes a BAT generation unit to generate a BAT in the disk that records a connection relationship between blocks of the disk based on a connection relationship between data stored in the respective blocks generated by dividing storage space of the disk; and a BAT revision unit to revise the connection relationship when the connection relationship between the blocks is changed.

According to another aspect of the present invention, a computer readable recording medium is provided having recorded thereon a program to execute a method of editing multimedia data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
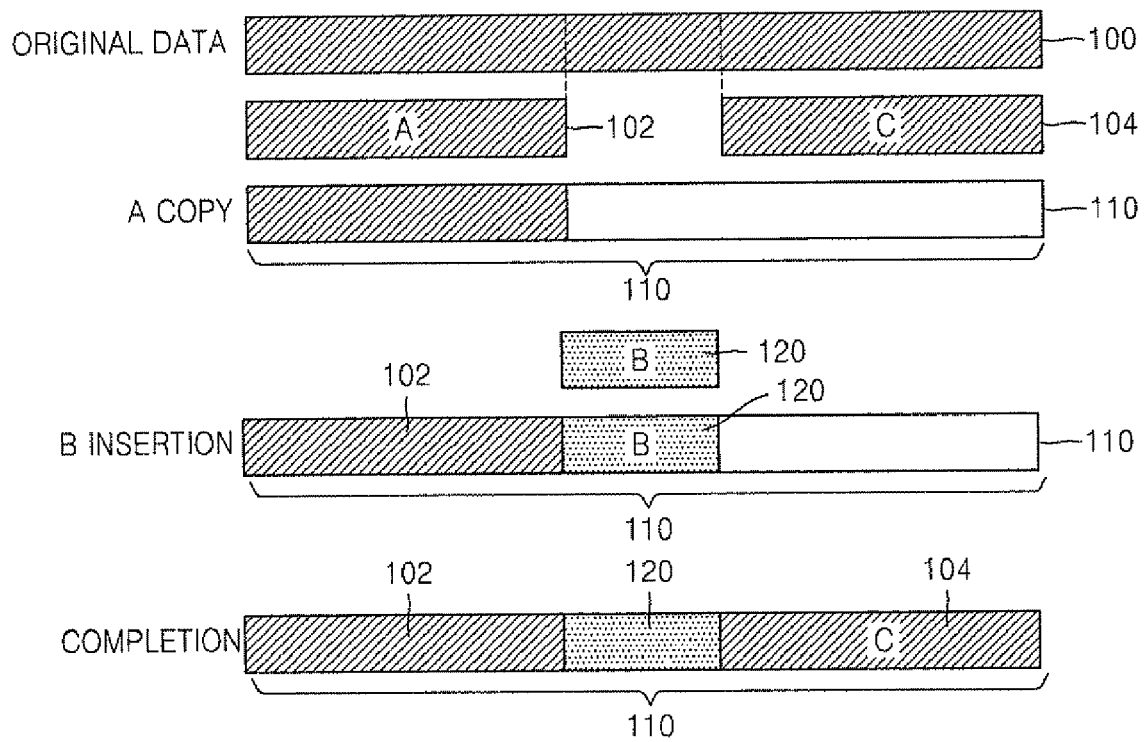
FIG. 1A is a diagram illustrating a method of inserting data in a conventional method of editing multimedia data.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
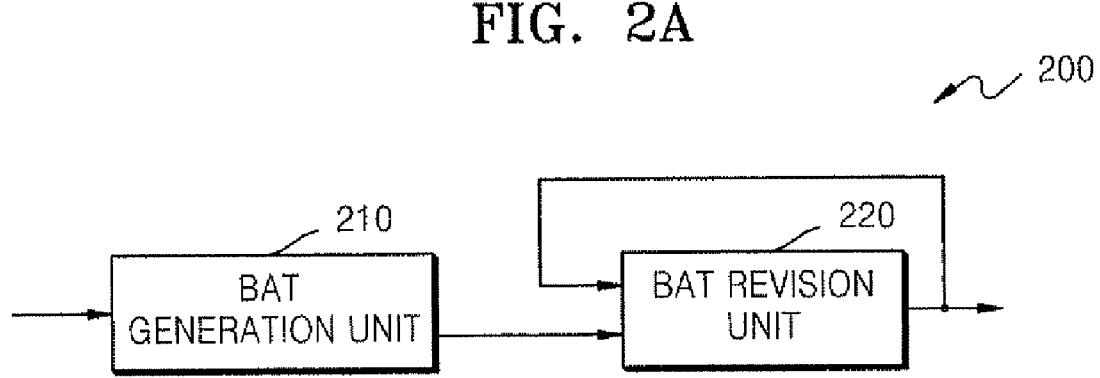
FIG. 2A is a block diagram illustrating a multimedia data edit apparatus according to an embodiment of the present invention.

FIG. 2A shows a multimedia data edit apparatus 200 according to an embodiment of the present invention. The multimedia data edit apparatus 200 includes a Block Allocation Table (BAT) generation unit 210 and a BAT revision unit 220. According to other aspects of the invention, the multimedia data edit apparatus 200 may include additional and/or different units. Similarly, the functionality of the above units may be integrated into a single component.

When a storage space of a disk is divided into blocks of a predetermined size, the BAT generation unit 210 generates a BAT in the disk. The BAT records a connection relationship between each of the blocks based on a connection relationship between each item of data stored in the respective blocks. The generated BAT is output to the BAT revision unit 220.

The BAT revision unit 220 revises or updates a connection relationship between each of the blocks. The revised or updated connection relationship is recorded in the BAT based on a connection relationship between each of the blocks that are changed by editing the multimedia data, using the BAT input from the BAT generation unit 210. The BAT revised or updated by the BAT revision unit 220 is again output to the BAT revision unit 220 and is used in editing the multimedia data.

Figure 1B:
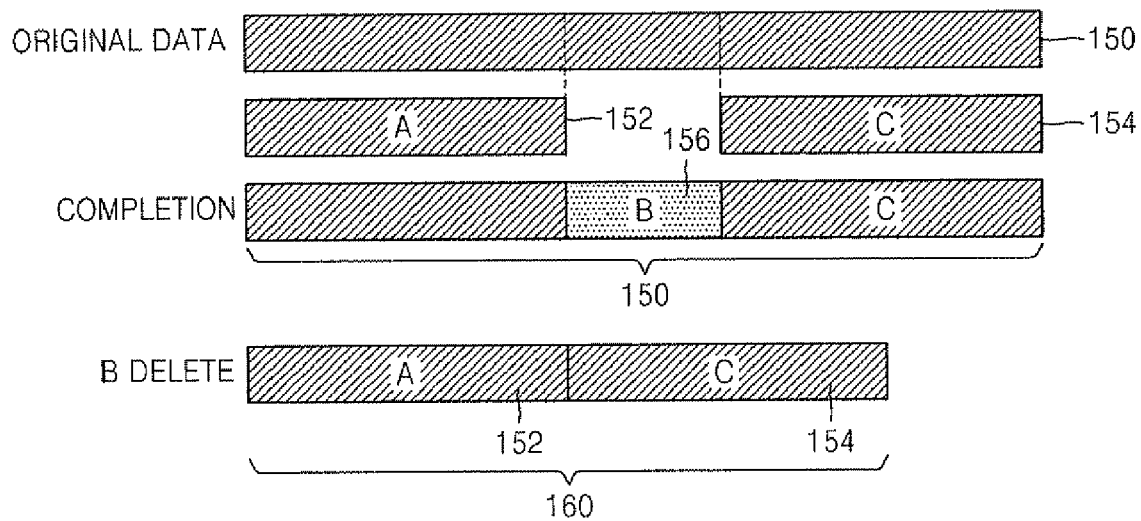
FIG. 1B is a diagram illustrating a method of deleting data in a conventional method of editing multimedia data.
Figure 2B:
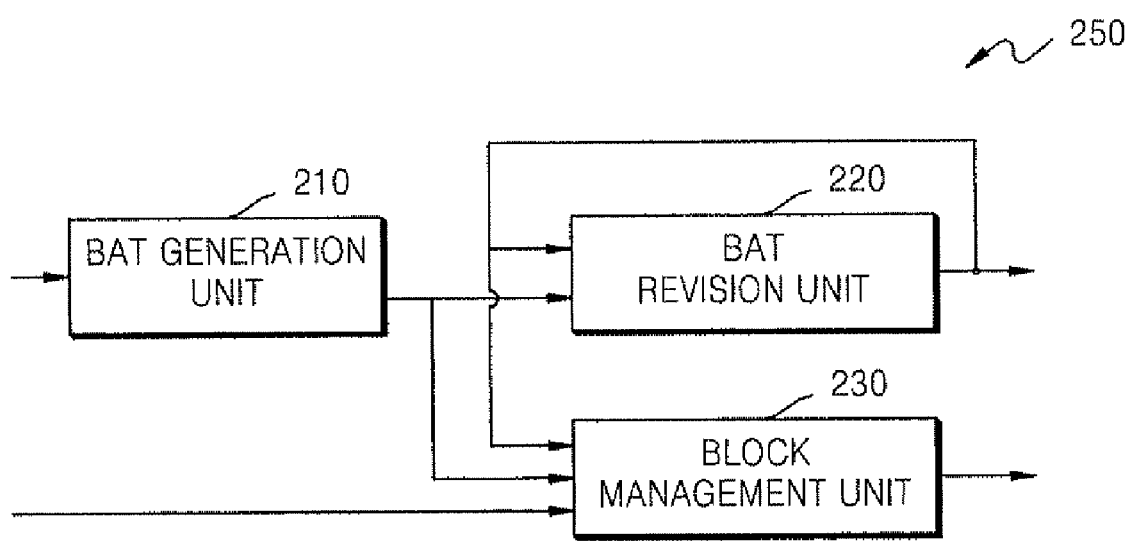
FIG. 2B is a block diagram illustrating a multimedia data edit apparatus according to another embodiment of the present invention.

FIG. 2B shows a multimedia data edit apparatus 250 according to another embodiment of the present invention. The multimedia data edit apparatus 250 includes a BAT generation unit 210, a BAT revision unit 220, and a block management unit 230. Functions and operations of the BAT generation unit 210 and the BAT revision unit 220 are respectively the same as those of the BAT generation unit 210 and the BAT revision unit 220 shown in FIG. 1, and thus, only differences between the two will now be described.

The BAT generation unit 210 of the multimedia data edit apparatus 250 generates a BAT, and outputs the BAT to the block management unit 230 and the BAT revision unit 220. According to an edit command that is input so as to edit multimedia data, the block management unit 230 manages movement or storage of data that is stored in blocks, using the BAT input from the BAT generation unit 210. Indications from the block management unit 230 are output to blocks in a disk.

The BAT revision unit 220 revises or updates a connection relationship between each of the blocks. The revised or updated connection relationship is recorded in the BAT based on a connection relationship between each of the blocks that are changed by editing the multimedia data, using the BAT input from the BAT generation unit 210 and a result of the block management indications input from the block management unit 230. The BAT revised or updated by the BAT revision unit 220 is again output to the block management unit 230 and the BAT revision unit 220, and is used in editing the multimedia data.

Figure 3:
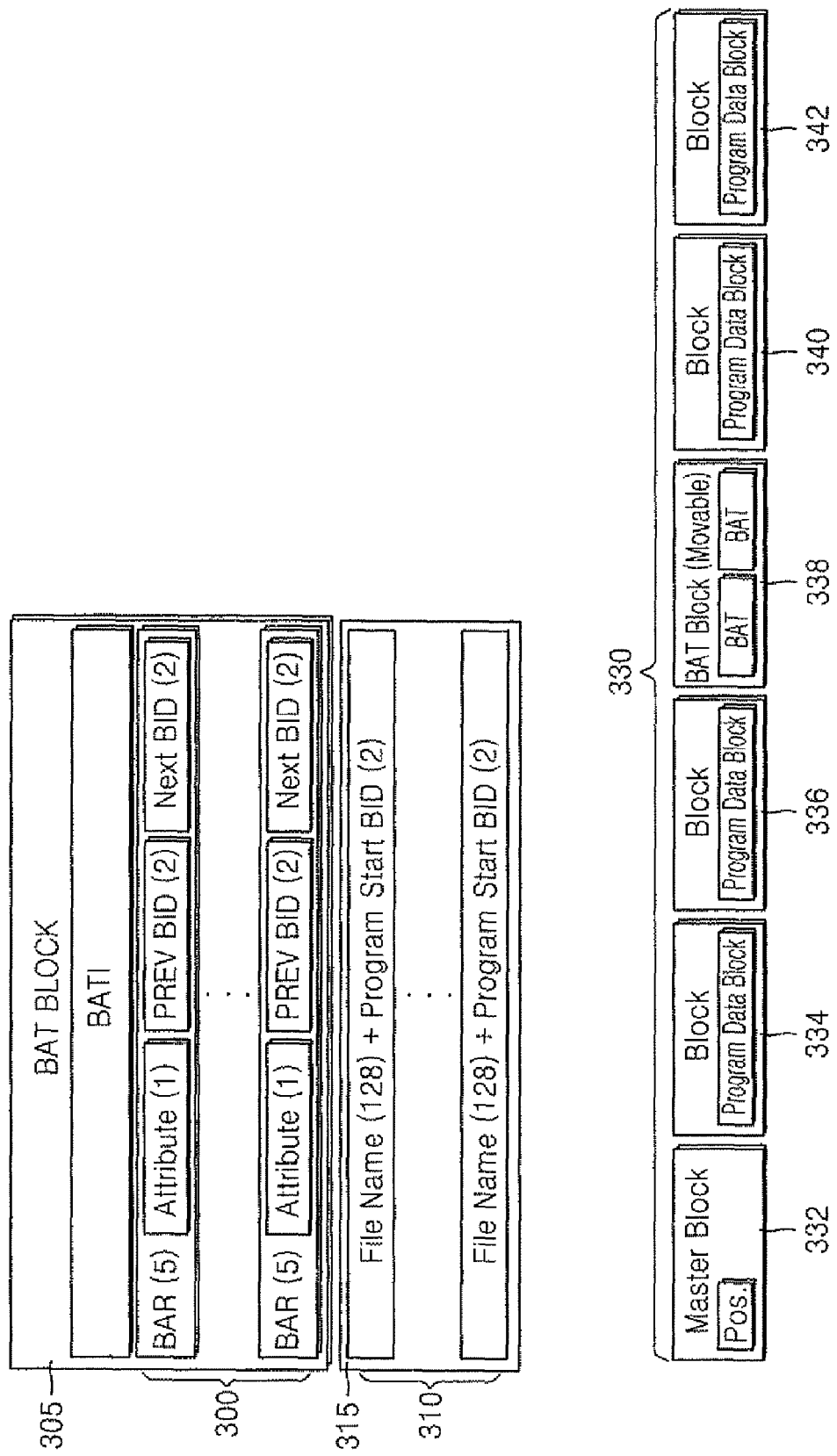
FIG. 3 is a diagram illustrating a configuration of a Block Allocation Table (BAT) according to an embodiment of the present invention.

FIG. 3 shows a configuration of a BAT 300 according to an embodiment of the present invention. The BAT 300 stores a block allocation record (BAR), which is management information on each block, when a storage space of a disk is divided into blocks of a predetermined size. Each block has a corresponding BAR. The BAT 300 is stored in a BAT block 305 in the disk. Since the storage space of the disk is divided in units of single blocks, multimedia data is also divided and respectively stored in each block.

A single disk may be divided into 65,536 blocks, and thus, the size of the blocks may correspond to the size of one block of the 65,536 blocks generated by dividing a total storage capacity of the disk. The number of blocks may vary depending on the size of the disk and the particular formatting technique employed. However, considering the size of data to be stored in each block, the size of one block may be larger than at least 4 megabytes. Where the size of one block is smaller than 4 megabytes, the size of one block may be fixed at 4 megabytes, and thus, the number of blocks may be less than the 65,536 blocks. These limits are merely exemplary; other aspects of the invention may employ different limits or no limits entirely.

The BAR included in the BAT 300 has attribute information (Attribute), a previous block index (PREV BID), and a next block index (Next BID). The attribute information (Attribute) indicates an attribute of a block, the previous block index (PREV BID) indicates a block storing previous data of multimedia data stored in a current block, and the next block index (Next BID) indicates a block storing next data of the multimedia data stored in the current block.

1 byte, 2 bytes, and 2 bytes may be allocated to each of the attribute information (Attribute), the previous block index (PREV BID), and the next block index (Next BID) which are included in the BAR of the BAT 300. 5 bytes (1+2+2 bytes) may be allocated to one BAR, and there may be 65,536 blocks. Thus, 320 kilobytes (65,536×5 bytes) may be allocated to the BAT block 305. Other aspects of the invention may allocate a different amount of bytes to the information included in the BAR.

A program list 310 includes information on a multimedia data file. A plurality of the program lists 310 may be stored in a program list block 315 of the disk. The program list 310 includes file name information (File Name) and program start block information (Program Start BID). The file name information (File Name) indicates a file name of the multimedia data file stored in the disk. The program start block information (Program Start BID) indicates a first block from which the multimedia data file starts to be stored. The program list 310 may store not only the file name information (File Name) and the program start block information (Program Start BID), but also a generation time of each item of the multimedia data stored in a corresponding block.

128 bytes and 2 bytes may be allocated to each of the file name information (File Name) and the program start block information (Program Start BID) included in the program list 310. Thus, 130 bytes may be allocated to one program list 310. Since 1,024 programs may be stored in one disk, 130 kilobytes (1,024×130 bytes) may be allocated to the program list block 315. Other aspects of the invention may allocate a different amount of bytes to the program list 310.

A disk 330 may include a master block 332, a plurality of blocks 334, 336, 340, and 342, and a BAT block 338. The master block 332 manages information on the BAT 300. The plurality of blocks 334, 336, 340, and 342 store multimedia data or other types of data. A position of the BAT block 338 may be movable. The BAT block 338 may include a plurality of BARs.

FIG. 3 shows only an example in which the BAT 300 includes the plurality of BARs. However, in another example, one BAR may correspond to one BAT, and the number of BATs may be equal to the number of blocks. Each BAT block may have a plurality of BATs.

The program list 310 may be used when a user desires to reproduce multimedia data having a predetermined file name. The user scans a first block storing the multimedia data having the predetermined file name while referring to the program list 310, and searches for a connection relationship from the first block to next blocks in the BAT 300. The multimedia data may be reproduced by reading data stored in each of the blocks 334, 336, 340, and 342, according to block information scanned in the program list 310 and the BAT 300.

Figure 4A:
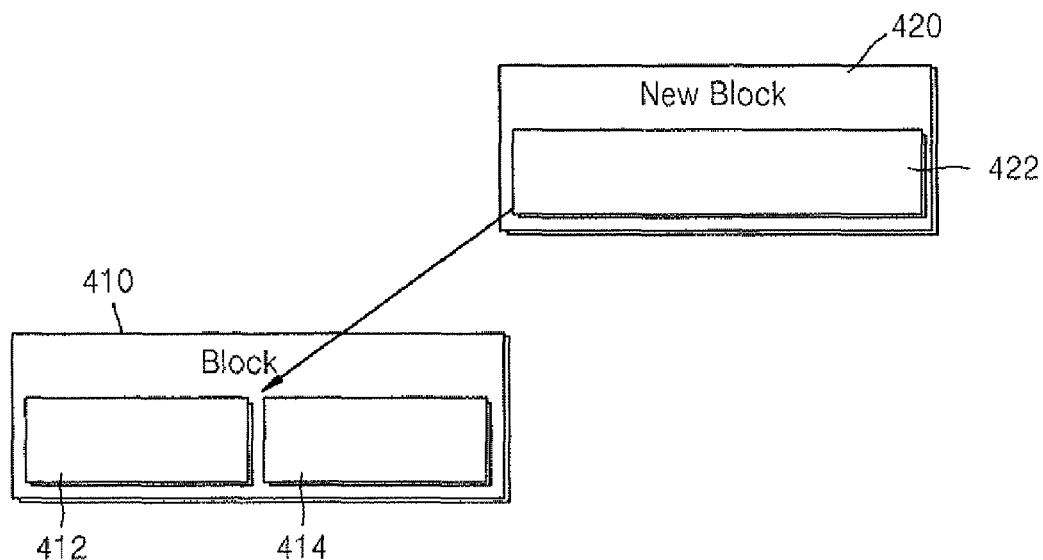
FIG. 4A illustrates multimedia data before data stored in a second block is inserted into data stored in a first block according to an embodiment of the present invention.

Operations of the block management unit 230 and the BAT revision unit 220 for editing multimedia data will be described in detail with respect to FIGS. 4A-8. FIG. 4A shows multimedia data before data stored in a second block 420 is inserted into data stored in a first block 410, according to an embodiment of the present invention. The first block 410 stores first transport stream data 412 and second transport stream data 414. The second block 420 stores third transport stream data 422. The third transport stream data 422 is to be inserted between the first transport stream data 412 and the second transport stream data 414.

Figure 4B:
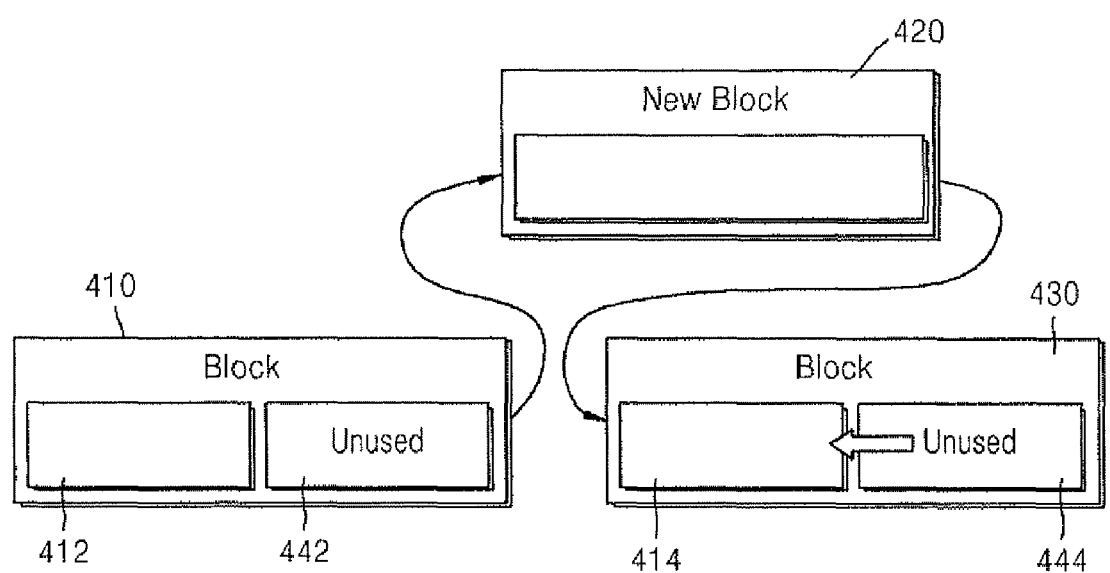
FIG. 4B illustrates multimedia data after data stored in a second block is inserted into data stored in a first block according to an embodiment of the present invention.

FIG. 4B shows the multimedia data after the data stored in the second block 420 is inserted into the data stored in the first block 410, according to an embodiment of the present invention. In order to insert the third transport stream data 422 of the second block 420 between the first transport stream data 412 and the second transport stream data 414 of the first block 410, the block management unit 230 may not move the first transport stream data 412 from an original position in the first block 410 but may move and store the second transport stream data 414 in a new third block 430.

The BAT revision unit 220 adds a connection relationship among the first block 410, the second block 420, and the third block 430, thereby updating a BAT. A next block index of a BAT of the first block 410 is updated to the second block 420, and each previous block index and next block index of a BAT of the second block 420 is respectively updated to indicate the first block 410 and the third block 430. A previous block index of a BAT of the third block 430 is updated so as to indicate the second block 420.

The block management unit 230 may store the second transport stream data 414 in a storage start position of the third block 430. The block management unit 230 may determine an empty area 442 of the first block 410 and an empty area 444 of the third block 430 to be an unused area. The empty area 442 stored the second transport stream data 414, and the empty area 444 exists after an area in which the second transport stream data 414 is stored. A start position of storage spaces of the first block 410 and the third block 430 has no empty area.

Figure 5A:
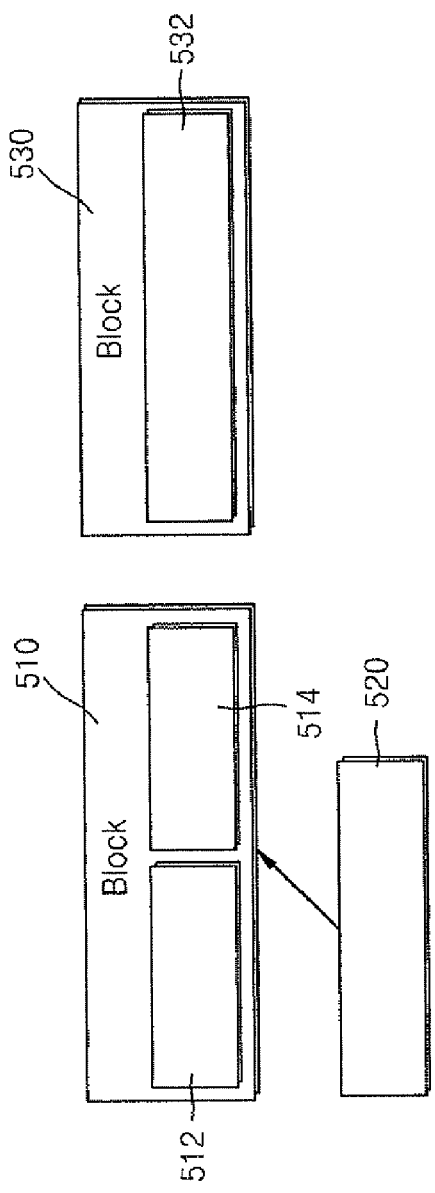
FIG. 5A illustrates multimedia data before input data is inserted into data stored in a first block according to an embodiment of the present invention.

FIG. 5A shows multimedia data before input data is inserted into data stored in a first block 510 according to an embodiment of the present invention. The first block 510 stores first transport stream data 512 and second transport stream data 514. A second block 530 stores third transport stream data 532. New transport stream data that is fourth transport stream data 520 is to be inserted between the first transport stream data 512 and the second transport stream data 514. The fourth transport stream data 520 is not yet stored in a disk, and corresponds to transport stream data that currently exists in a network is being downloaded, or is stored in a memory.

Figure 5B:
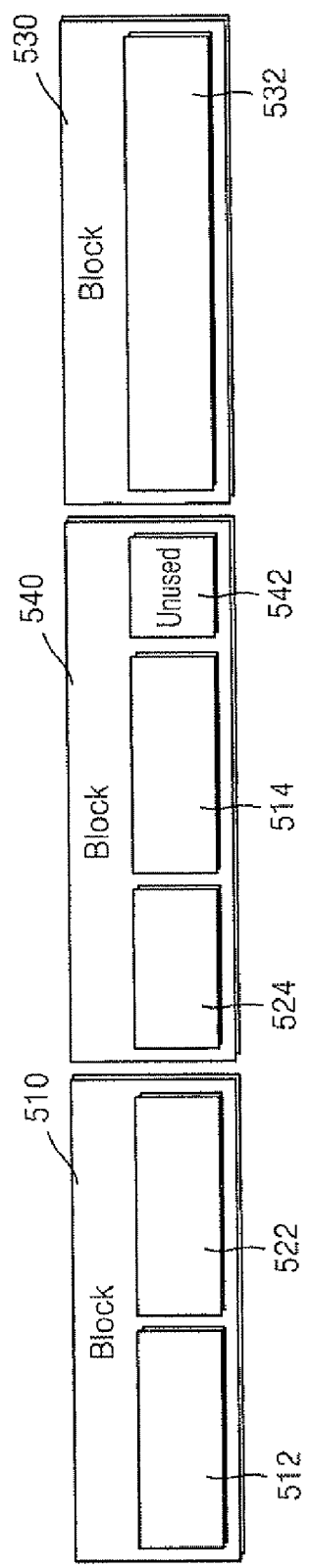
FIG. 5B illustrates multimedia data after input data is inserted into data stored in a first block according to an embodiment of the present invention.

FIG. 5B shows the multimedia data after the input data is inserted into the data stored in the first block 510 according to an embodiment of the present invention. The block management unit 230 moves and stores the second transport stream data 514 in a temporary storage area (not shown), and stores data 522, the size of which depends on an area in which the second transport stream data 514 was stored, after the first transport stream data 512 of the first block 510. The data 522 is from the fourth transport stream data 520 that is input.

Remaining data 524 from the input fourth transport stream data 520 is stored in a storage start position of a third block 540 that is a new block, and the second transport stream data 514 is stored in a remaining area existing after an area of the third block 540. The area stores the remaining data 524. In the third block 540, an empty area 542 existing after the remaining area storing the second transport stream data 514 is determined to be an unused area.

The BAT revision unit 220 may revise and update a BAT based on a connection relationship between the first block 510 and the third block 540. The next block index of the first block 510 is updated to indicate the third block 540, and the previous block index and next block index of the third block 540 are updated to indicate the first block 510 and the second block 530. The previous block index of the second block 530 is updated to the third block 540.

In the embodiment described with reference to FIGS. 4B and 5B, the empty areas 442, 444, and 542 generated by moving or storing data may be determined to be the unused area. Only when the size of the empty areas 442, 444, and 542 is smaller than a size of data to be connected next are the empty areas 442, 444, and 542 determined to be an unused area, so as to prevent additional data movement and memory access.

However, where the size of the empty areas 442, 444, and 542 is larger than the size of data to be connected next, data of a current block and data of a next block may be stored in the same block to increase efficiency. The block management unit 230 may store the data of the next block in a remaining area of the current block and thereby merge the two blocks.

Figure 6:
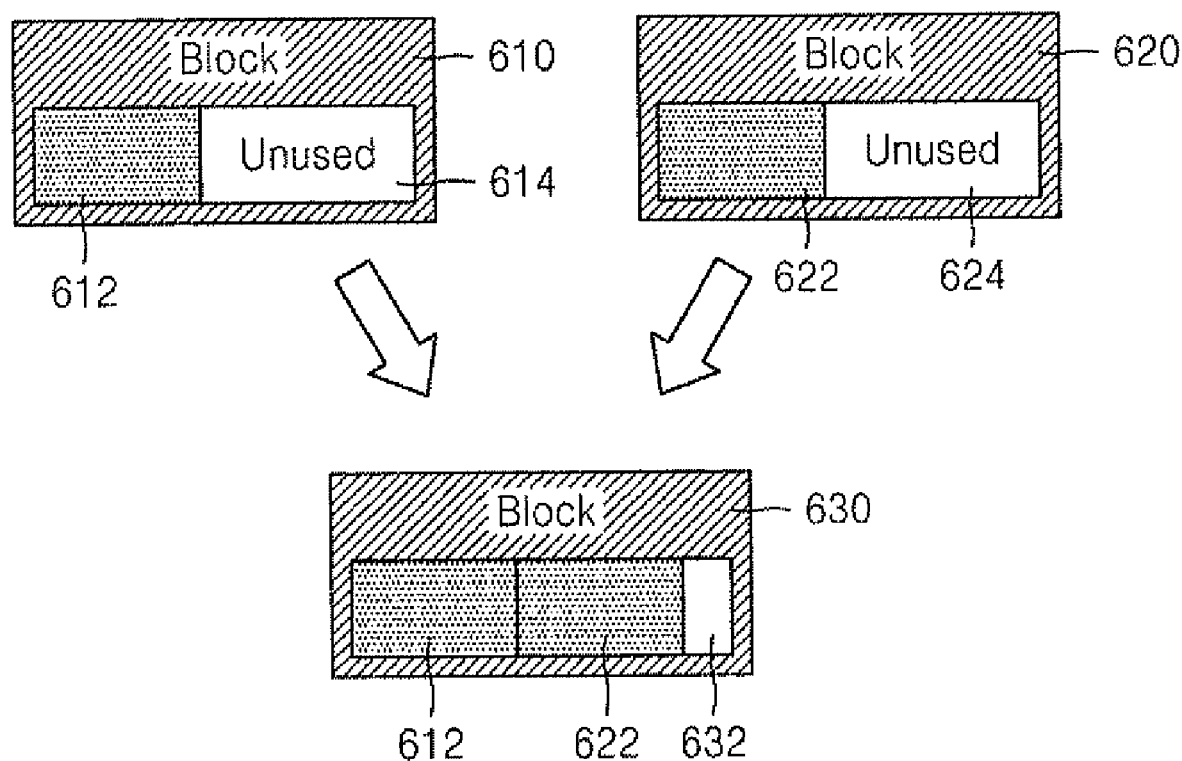
FIG. 6 is a diagram illustrating a process of merging data stored in each of two blocks into one block, according to an embodiment of the present invention.

The above described merging procedure will now be described in more detail with reference to FIG. 6. FIG. 6 shows a process of merging data stored in each of two blocks into one block, according to an embodiment of the present invention. As shown in FIG. 6, a first block 610 only stores first data 612. A remaining area 614 other than the area storing the first data 612 is an unused area. A second block 620 only stores second data 622. A remaining area 624 other than an area storing the second data 622 is an unused area.

When a size of the remaining area 614 existing after the area storing the first data 612 in the first block 610 is larger than a size of the second data 622, the block management unit 230 may store the second data 622 in the remaining area 614 existing after the first data 612 of the first block 610. The BAT revision unit 220 deletes a connection relationship between the first block 610 and the second block 620 in a BAT, and deletes the second block 620.

Figure 7A:
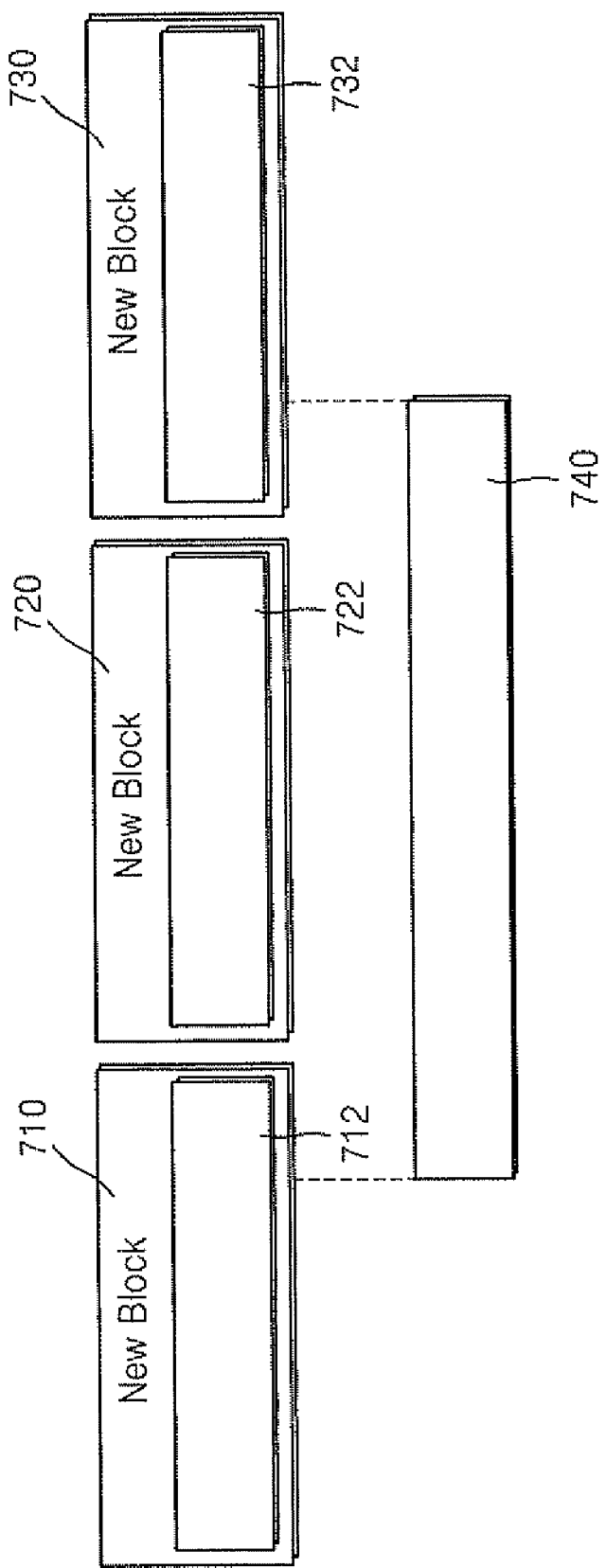
FIG. 7A is a diagram illustrating multimedia data before data is deleted according to an embodiment of the present invention.

FIG. 7A shows multimedia data before data is deleted according to an embodiment of the present invention. As shown in FIG. 7A, a first block 710 stores first data 712, a second block 720 stores second data 722, and a third block 730 stores third data 732. The first, second, and third data 712, 722, and 732 are connected data configuring a single multimedia data file. The Multimedia data 740 that is stored in the first, second, and third blocks 710, 720, and 730 is to be deleted.

Figure 7B:
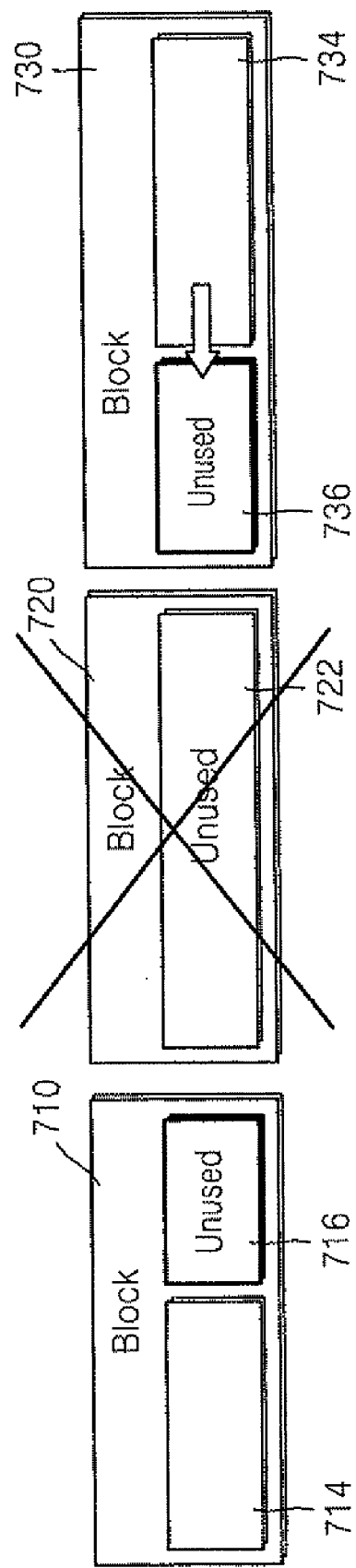
FIG. 7B is a diagram illustrating multimedia data after data is deleted according to an embodiment of the present invention.

FIG. 7B shows the multimedia data after the data is deleted, according to an embodiment of the present invention. The first block 710 stores a start part 716 (data 716) of the multimedia data 740 that is to be deleted. The third block 730 stores an end part 736 (data 736) of the multimedia data 740 that is to be deleted. In order to delete the multimedia data 740, the block management unit 230 may determine an area storing the data 716 to be deleted from the first block 710 as an unused area. The block management unit 230 may determine an area storing the end part 736 to be deleted from the second block 730 as an unused area.

After deleting the multimedia data 740, the block management unit 230 may move and store remaining data 734 of the third block 730 in a storage start position 730 of the second block 730, and may position an unused area after the remaining data 734 where the deleted data was stored. Where the multimedia data 740 to be deleted further includes data 722 of one or more blocks (including the second block 720) between the data 716 of the first block 710 and the data 736 of the second block 730, the block management unit 230 may delete the data 722 stored in the one or more blocks.

The BAT revision unit 220 may delete a connection relationship among the first block 710, the one or more blocks, and the third block 730, and may revise a BAT based on a connection relationship between the first block 710 and the third block 730. A next block index of a BAT of the first block 710 is revised to indicate the third block 730, and a previous block index of a BAT of the third block 730 is revised to indicate the first block 710.

Figure 8:
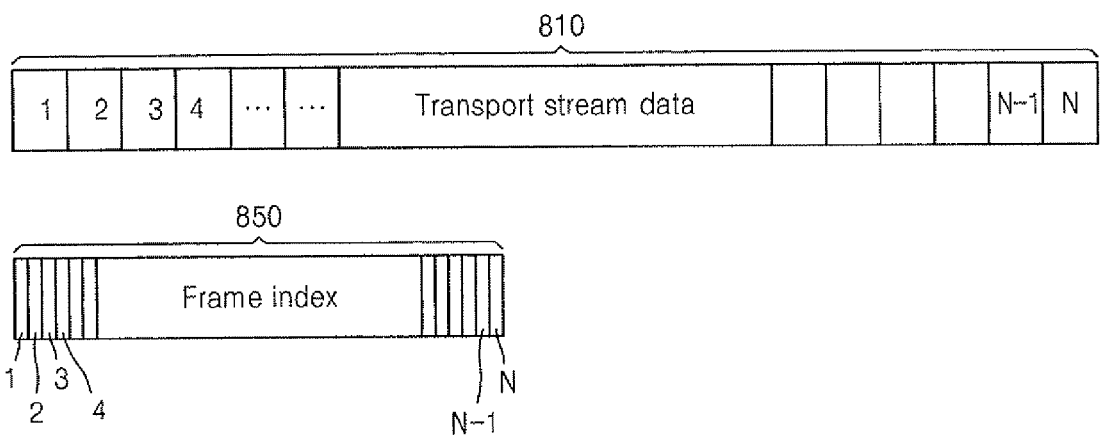
FIG. 8 is a diagram illustrating an editing process using a frame index or metadata, according to an embodiment of the present invention.

FIG. 8 shows an editing process using a frame index 850 or metadata, according to an embodiment of the present invention. The multimedia data edit apparatuses 200 and 250 may generate the frame index 850 having recorded therein frame information on a plurality of frames, where N is an integer larger than 0 and the transport stream data 810 exists in a range of a first frame to an $N^{th}$ frame.

The frame information has recorded therein at least one of reproduction time information, storage position information, and/or a type of a frame, which are of a corresponding frame. The frame index 850 may be generated in a multimedia data file, in the form of the metadata, and may be recorded in a part of an area of a disk.

In order to edit the transport stream data 810 (multimedia data) in units of single frames, the multimedia data edit apparatuses 200 and 250 may use the frame index 850. The multimedia data edit apparatuses 200 and 250 receive the frame information of a frame to be edited, extract the frame information from the frame index 850, and determine blocks storing frames to be edited, using the extracted frame information.

When the blocks storing frames to be edited are determined, the block management unit 230 may edit data in the blocks using the aforementioned insertion, merging, or deletion processes. The BAT revision unit 220 may revise a connection relationship between each of the blocks, according to a result of editing.

Figure 9:
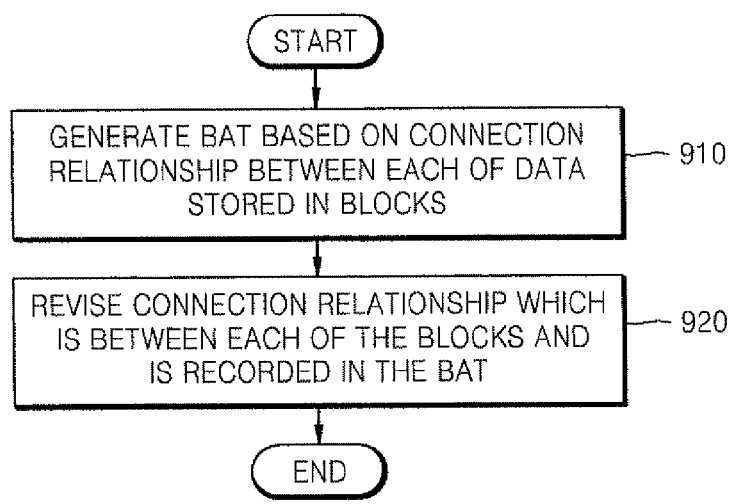
FIG. 9 is a flowchart illustrating a process of editing multimedia data, according to an embodiment of the present invention.

FIG. 9 is a flowchart of a process of editing multimedia data, according to an embodiment of the present invention. In operation 910, a BAT is generated in a disk. The BAT records a connection relationship between each block based on a connection relationship between each item of data stored in the respective blocks that are generated by dividing a storage space of the disk having a predetermined size. In operation 920, when the connection relationship between each of the blocks changes, the connection relationship, which is between each of the blocks and is recorded in the BAT, is changed.

The method and apparatus for editing multimedia data according to aspects of the present invention manages data in units of single blocks, and uses a connection relationship between each block, thereby reducing an actual data movement and copy procedure and minimizing the requirement related to a memory or temporary disk space. By doing so, spatial efficiency of the disk is maximized. Also, access frequency to the memory or a temporary disk for moving or storing data is minimized, and thus, the time required to edit the data can be reduced.

Additional aspects of the present invention can be used to easily edit multimedia data in units of single frames by using a frame index, thereby enabling the efficient and prompt performance of a data edit. Thus, it is possible to obtain editing capabilities that satisfy user expectations. Further, aspects of the present invention can perform spatial-temporal efficient data editing related to mass multimedia data, and thus, can be used in products such as a personal video recorder (PVR), a Digital Television (DTV), Internet Protocol TV (IPTV), and the like.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CD-ROMs, magnetic tapes, floppy disks, optical data storage devices, and DVDs. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of editing multimedia data stored in a disk, the method comprising:
generating a BAT (Block Allocation Table) in the disk, wherein the BAT records a connection relationship between a plurality of blocks based on a connection relationship between data stored in the respective blocks generated by dividing storage space of the disk having a predetermined size; and
revising the connection relationship when the connection relationship between each of the blocks is changed, wherein the plurality of blocks are physical blocks constituting the disk, wherein
the BAT comprises a number of BARs (Block Allocation Records) equal to the number of blocks; and
each BAR comprises a data size, a previous block index, and a next block index that are stored in a corresponding block.

2. The method of claim 1, further comprising managing movement or storage of the data stored in the blocks.

3. The method of claim 2, wherein, when inserting data of a second block between first data that is previous data and second data that is next data, which are divided based on a predetermined position of each data in a first block:
the managing comprises moving and storing the second data in a third block without moving the first data from the first block; and
the revising of the connection relationship in the BAT comprises revising the BAT based on a connection relationship among the first block, the second block, and the third block.

4. The method of claim 3, wherein:
the managing comprises storing the second data in a storage start position of the third block and determining empty areas of the first block and the third block made by moving the second data from the first block to the third block to be unused areas.

5. The method of claim 2, wherein, when inserting input data between first data that is previous data and second data that is next data, which are divided based on a predetermined position of each data in a first block, the managing comprises:
moving and storing the second data in a temporary storage area;
storing part of the input data after the first data of the first block corresponding to a size of an area in which the second data was stored;
storing remaining data of the input data in a storage start position of a second block that is a new block; and
storing the second data after an area in the second block that stores the remaining data of the input data; and
the revising of the connection relationship in the BAT comprises revising the BAT based on a connection relationship between the first block and the second block.

6. The method of claim 5, wherein, in the second block, an empty area existing after an area storing the second data is determined to be an unused area.

7. The method of claim 2, wherein, when merging a first block and a second block, where first data is stored in the first block and second data is stored in the second block, if an empty area existing after an area storing the first data of the first block is larger than a size of the second data:
the managing comprises storing the second data in the empty area existing after the first data of the first block; and
the revising of the connection relationship in the BAT comprises deleting a connection relationship between the first block and the second block from the BAT.

8. The method of claim 2, wherein, when deleting the data, when a first block stores a start part of the data and a second block stores an end part of the data, the managing comprises:
determining an area storing the start part of the data in the first block to be an unused area;

determining an area storing the end part of the data in the second block to be an unused area; and storing data of a remaining area of the second block in a storage start position of the second block.

9. The method of claim 8, wherein, when the data further comprises other data of one or more blocks between the start part of the data of the first block and the end part of the data of the second block:

the managing further comprises deleting the other data of the one or more blocks; and the revising of the connection relationship in the BAT comprises deleting a connection relationship among the first block, the one or more blocks, and the second block, and revising the BAT based on a connection relationship between the first block and the second block.

10. The method of claim 1, further comprising:

generating a frame index including frame information that is at least one of reproduction time information per frame of the multimedia data, storage position information, and information on a kind of a frame;

extracting from the frame index the frame information on one or more frames to be edited; and determining blocks storing the one or more frames to be edited, using the extracted frame information;

wherein the revising of the connection relationship in the BAT comprises revising a relationship among each of the determined blocks in the BAT.

11. A multimedia data edit apparatus to edit multimedia data stored in a disk having a predetermined size, the multimedia data edit apparatus comprising:

a BAT generation unit to generate a Block Allocation Table (BAT) in the disk that records a connection relationship between blocks of the disk based on a connection relationship between data stored in the respective blocks generated by dividing storage space of the disk; and a BAT revision unit to revise the connection relationship when the connection relationship between the blocks is changed, wherein the plurality of blocks are physical blocks constituting the disk, wherein the BAT comprises a number of BARs (Block Allocation Records) equal to the number of blocks; and each BAR comprises a data size, a previous block index, and a next block index, which are stored in a corresponding block.

12. The multimedia data edit apparatus of claim 11, further comprising a block management unit to manage movement or storage of the data stored in the blocks.

13. The multimedia data edit apparatus of claim 12, wherein, when inserting data of a second block between first data that is previous data and second data that is next data, which are divided based on a predetermined position of each data in a first block:

the block management unit moves and stores the second data in a third block without moving the first data from the first block, and the BAT revision unit revises the BAT based on a connection relationship among the first block, the second block, and the third block.

14. The multimedia data edit apparatus of claim 13, wherein:

the block management unit stores the second data in a storage start position of the third block and determines empty areas of the first block and the third block made by moving the second data from the first block to the third block to be unused areas.

15. The multimedia data edit apparatus of claim 12, wherein, when inserting input data between first data that is previous data and second data that is next data, which are divided based on a predetermined position of each data in a first block:

the block management unit moves and stores the second data in a temporary storage area; stores a part of the input data after the first data of the first block corresponding to a size of an area in which the second data was stored; stores remaining data of the input data in a storage start position of a second block that is a new block; and stores the second data after an area in the second block that stores the remaining data of the input data; and the BAT revision unit revises the BAT based on a connection relationship between the first block and the second block.

16. The multimedia data edit apparatus of claim 15, wherein, in the second block, an empty area existing after an area storing the second data is determined to be an unused area.

17. The multimedia data edit apparatus of claim 12, wherein, when merging a first block and a second block, when first data is stored in the first block and second data is stored in the second block, if an empty area existing after an area storing the first data of the first block is larger than a size of the second data:

the block management unit stores the second data in the empty area existing after the first data of the first block; and the BAT revision unit deletes a connection relationship between the first block and the second block from the BAT.

18. The multimedia data edit apparatus of claim 12, wherein, when deleting data, where a first block stores a start part of the data and a second block stores an end part of the data, the block management unit determines an area storing the start part of the data in the first block to be an unused area, determines an area storing the end part of the data in the second block to be an unused area, and stores data of a remaining area of the second block in a storage start position of the second block.

19. The multimedia data edit apparatus of claim 18, wherein, when the data further comprises other data of one or more blocks between the start part of the data of the first block and the end part of the data of the second block:

the block management unit deletes the other data of the one or more blocks; and the BAT revision unit deletes a connection relationship among the first block, the one or more blocks, and the second block; and revises the BAT based on a connection relationship between the first block and the second block.

20. The multimedia data edit apparatus of claim 11, wherein:

the multimedia data edit apparatus generates a frame index having frame information that is at least one of reproduction time information per frame of the multimedia data, storage position information, and information on a kind of a frame, extracts the frame information on one or more frames to be edited from the frame index, and determines blocks storing the one or more frames to be edited, using the extracted frame information; and the BAT revision unit revises a relationship among each of the determined blocks in the BAT.

21. A computer readable recording medium having recorded thereon a program to execute the method of claim 1.

* * * * *